United States Patent [19]

Conley, Jr. et al.

[11] Patent Number: 5,614,057
[45] Date of Patent: Mar. 25, 1997

[54] AUTOMATIC ULTRASONIC FUSING SYSTEM

[75] Inventors: Ralph F. Conley, Jr., Miamisburg, Ohio; James R. Young, Gainesville, Ga.

[73] Assignee: MIM Industries, Inc., Miamisburg, Ohio

[21] Appl. No.: 838,543

[22] Filed: Feb. 19, 1992

[51] Int. Cl.⁶ ........................................ B32B 31/16
[52] U.S. Cl. .................... 156/354; 156/360; 156/378; 156/492; 156/502; 156/511; 156/517; 156/543; 156/556; 156/559; 156/580.1
[58] Field of Search .................... 156/353, 354, 156/360, 378, 502, 510, 511, 516, 517, 543, 556, 559, 560, 562, 580.1, 492; 269/56; 428/100

[56] References Cited

U.S. PATENT DOCUMENTS

| | | | |
|---|---|---|---|
| 3,799,086 | 3/1974 | Block | 112/121.15 |
| 3,827,683 | 8/1974 | Seborg et al. | 269/56 X |
| 4,255,226 | 3/1981 | Crofts et al. | 269/56 X |
| 4,305,338 | 12/1981 | Adamson | 112/113 |
| 4,411,721 | 10/1983 | Wishart | 156/73.1 |
| 4,455,952 | 6/1984 | Morin et al. | 112/121.12 |
| 4,489,873 | 12/1984 | Yoshida et al. | 226/162 |
| 4,530,729 | 7/1985 | Fuchs et al. | 156/492 X |
| 4,665,679 | 5/1987 | Watanabe | 53/131 |
| 4,708,072 | 11/1987 | Frye | 112/121.27 |
| 4,752,351 | 6/1988 | Lunt | 156/580.1 |
| 4,854,251 | 8/1989 | Hiramatsu et al. | 112/121.12 |
| 4,881,997 | 11/1989 | Hatch | 156/66 |
| 4,906,318 | 3/1990 | Miyazaki | 156/352 |
| 4,920,904 | 5/1990 | Frye | 112/262.1 |

Primary Examiner—James Sells
Attorney, Agent, or Firm—Jacox, Meckstroth & Jenkins

[57] ABSTRACT

A method and apparatus is provided for fusing tabs of a hook or loop fastener material to opposing ends of an elongated band of cooperating hook or loop fastener material. The tabs are fed from two sources of a first material on opposing sides of a bonding station. The band is formed from a supply of a second material which is first fed to a transfer device having first and second grippers. The grippers transfer the band of material to the bonding station in a direction transverse to the transfer of the tabs to the bonding station, and the ends of the band are placed in overlapping relationship with the tabs. Subsequently, a pair of ultrasonic welding horns are moved into contact with the overlapping material to fuse the band of material to the tabs. The apparatus operates under the control of a programmable controller and the length of the band may be varied by altering a length of the second material fed between the grippers of the transfer mechanism.

17 Claims, 5 Drawing Sheets

AUTOMATIC ULTRASONIC FUSING SYSTEM

BACKGROUND OF THE INVENTION

This invention relates to a method and apparatus for producing fused bands of hook or loop fastener material and, more particularly, for bonding or fusing tabs of hook or loop fastener material to opposing ends of an elongated band of material. Further, the present invention relates to a method and apparatus for attaching tabs of material to an elongated band of material wherein an ultrasonic welding apparatus is used to activate a heat sensitive adhesive between the cooperating pieces of material.

Several apparatus are known for automatically attaching hook or loop fastener material such as VELCRO to a substrate piece of material wherein an ultrasonic welding device is used to activate a heat activatable adhesive for adhering the two materials to each other. One such device is shown in U.S. Pat. No. 4,411,721 to Wishart which discloses an apparatus for ultrasonically welding a patch of hook or loop fastener to a substrate in the form of a notebook binder. Individual binders are provided in a stack and are conveyed to a work station by means of pushers which position the substrate in alignment with welding horns above and below the substrate. A continuous tape of hook and loop fastener material is severed into individual patches and the patches are conveyed to the work station by a transport vacuum pad which transfers each patch to the welding horn, and the horn is provided with a vacuum for holding and conveying the patch onto the substrate.

U.S. Pat. No. 4,752,351 to Lunt discloses another apparatus for automatically feeding a hook or loop fastener material to a work station and cutting the material to form a patch for attachment to a substrate in an ultrasonic welding operation. In this apparatus, a welding horn cooperates with a spring biased operating block wherein movement of the welding horn downwardly into engagement with the block results in movement of the block to sever a patch of the hook or loop material which is also moved into engagement with the substrate during the downward movement of the welding horn. Subsequently, as the welding horn is moved upwardly, an accompanying upward movement of the operating block results in a forward feed of the hook or loop material in preparation for the next welding operation. It should be noted that in this apparatus the particular location of the substrate relative to the welding horn and patch to be welded must be regulated by an operator since there is no mechanism for controlling the location of the substrate.

While the above described apparatus provides satisfactory means for performing standard repetitive welding operations to attach hook or loop fastener material to substrates, these apparatus do not provide a means for producing a cut substrate of a predetermined length for receiving the hook or loop material. Further, the prior art devices fail to disclose an apparatus wherein tabs of hook or loop material may be attached to opposing ends of a length of a substrate material.

Accordingly, there is a need for a method and apparatus for attaching hook or loop fastener material to an elongated substrate wherein the tabs of material are attached to opposing ends of the substrate. In addition, there is a need for an apparatus wherein the elongated band of material forming a substrate is produced by the apparatus from a continuous length of substrate material and wherein the length of the band may be easily altered without altering the physical relationship between the elements forming the apparatus.

SUMMARY OF THE INVENTION

In accordance with the present invention, a method and apparatus is disclosed for automatically applying tabs of a first material, having a hook or loop fastener surface thereon, to opposing ends of an elongated band substrate which is also preferably formed having a hook or loop fastener surface. The tabs are each formed from continuous lengths of the first material which are supplied from a first supply source and which are cut to a predetermined length.

A second material for forming the elongated band to which the tabs are attached is supplied from a second supply source which includes means for feeding the second material, means for measuring the length of the second material and transfer means for carrying the second material into contact with the tabs. The transfer means includes first and second clamping means or grippers which are aligned with the feeding means during the operation of feeding the second material.

A bonding station is provided for receiving the tabs formed of the first material and the elongated band formed by the second material. The bonding station includes one or more ultrasonic welding devices whereby the first and second materials may be bonded or fused together.

The transfer means is mounted for movement toward and away from the bonding station in a direction transverse to the movement of the tabs into the bonding station. In addition, the bonding station includes first and second clamps for clamping the ends of the second material in overlapping relationship with the tabs formed of the first material whereby the materials are held in stationary relationship to each other as a pair of welding horns descend to bond the materials together.

During operation of the apparatus, the second material is fed to the transfer means until a sensor detects that an end of the material has passed the first clamping means whereupon a controller causes actuation of the first clamping means. The feeding means continues to feed material through the second clamping means until a predetermined length of material has been fed. Upon sensing that the predetermined length of material has been fed, the controller causes actuation of the second clamping means and severing means are actuated to sever the band of material from the continuous supply of second material.

During the time that the predetermined length of second material is fed out, the tabs of first material are fed past cutting means to a predetermined length, at which time the tabs are severed from their supply of first material. It should be noted that a supply of first material and cutting means are provided on opposing sides of the bonding station and pawl members are provided adjacent to each of the cutting means to convey the tabs in opposite directions toward the bonding station.

With the tabs in place at the bonding station, the transfer means moves forward with the band of second material until the ends of the band are in overlapping relationship with respective tabs. At this time, first and second clamps descend to engage the ends of the band and the welding horns descend to bond or fuse the band and tabs together to form a bonded band.

While the clamps are still engaged and after the welding horns lift away from the bonded band, flippers adjacent to each of the first and second clamps rotate around to flip the free ends of the tabs into contact with the band. Finally, an ejector plate is pivoted forwardly to cause the bonded band to slide off the first and second clamps and into a bundling tray. When a predetermined number of bands have been stacked into the bundling tray, one or more conventional plastic fasteners or ties may be injected through the stack of bands to create a bundle and the bundle may then be ejected from the system.

It should be noted that the length of the band of second material may be varied by altering the measured length at which the second clamping means and the severing means is actuated, and that this alteration in closing the second clamping means will not affect the positioning of the band relative to the tabs when it is transferred to the bonding station.

Therefore, it is an object of the present invention to provide a method and apparatus for automatically attaching tabs to the opposing ends of a length of material.

It is a further object of the invention to provide such a method and apparatus wherein continuous lengths of material may be provided and cut as needed.

It is an additional object of the invention to provide a method and apparatus for producing an elongated band of material having tabs bonded to the ends thereof wherein the length of the band may be conveniently altered.

It is yet another object of the invention to provide a method and apparatus for producing such bands wherein a predetermined quantity of bands may be bundled together for a subsequent application.

Other objects and advantages of the invention will be apparent from the following description, the accompanying drawings, and the appended claims.

DETAILED DESCRIPTION OF THE PREFERRED EMBODIMENT

Figure 1:
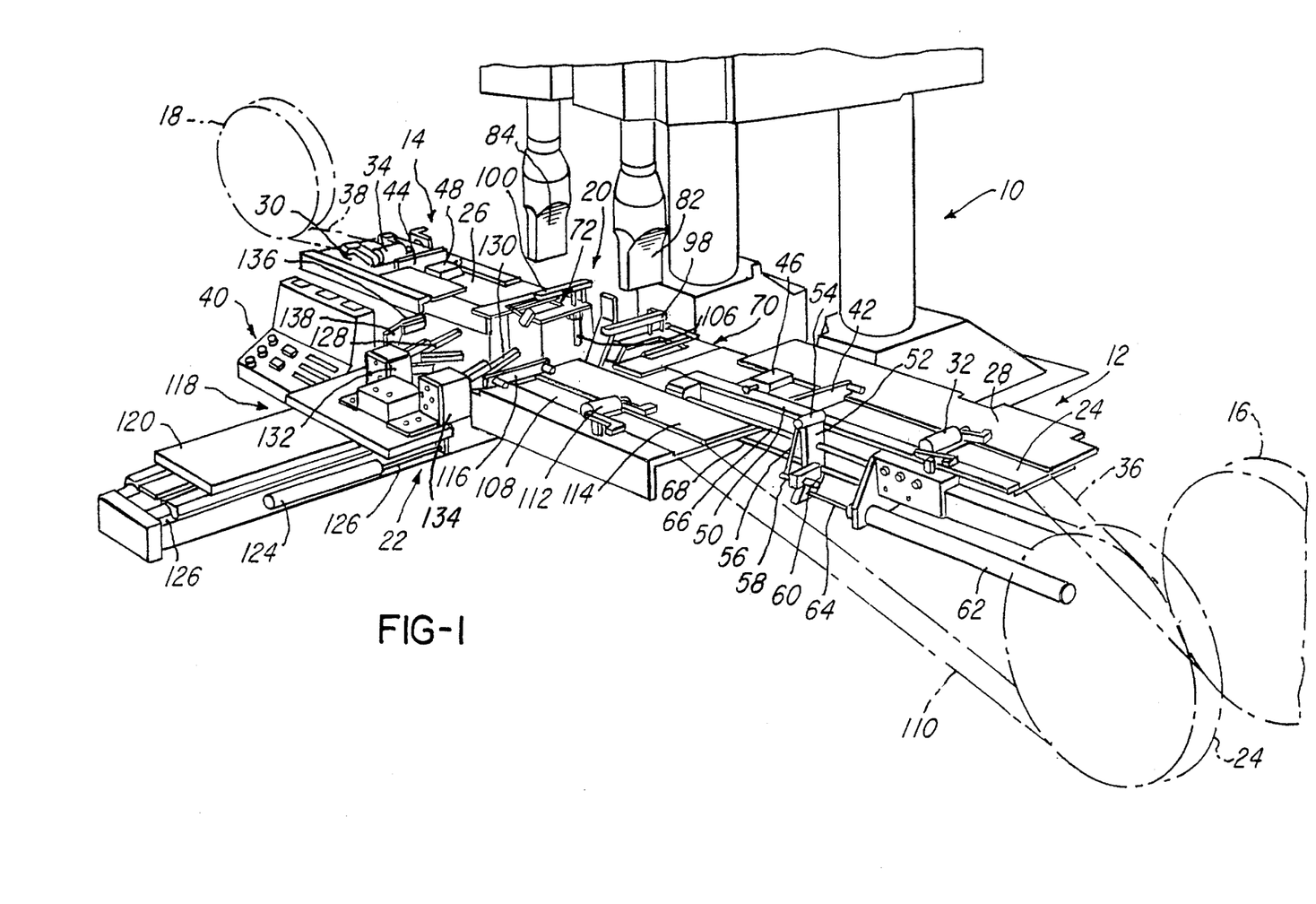
FIG. 1 is a perspective view of the apparatus of the present invention.

FIG. 1 illustrates the essential elements of the ultrasonic fusing system 10 of the present invention. The system 10 includes first supply means for supplying a length of a first material and the first supply means is defined by first and second stations, designated 12 and 14 respectively, each of which provides a predetermined length of a hook or loop material from respective supply rolls 16 and 18.

The first supply stations 12, 14 are located on opposing sides of a bonding station, designated generally as 20. In addition, a band supply station 22 is located adjacent to the bonding station 20 for supplying an elongated band of hook or loop fastener material from a continuous supply source 24.

Generally, a tab of hook or loop material such as VELCRO® is conveyed from the first and second stations 12, 14 to the bonding station 20, and a measured length of a second strip of VELCRO® material is transferred from the band supply station 22 to the bonding station 20 in overlapping relationship with a portion of the tabs transferred from the first material stations 12, 14. At the bonding station 20 the band of material is bonded to the tabs by means of an ultrasonic welding or fusing operation.

The first material supply stations 12, 14 are formed as substantially identical structures and include material guide troughs 24, 26 for guiding the first material from the supply rolls 16, 18 to the bonding station 20. It should be noted that the width of the troughs 24, 26 may be adjusted to accommodate different widths of the first material and, in the preferred embodiment, is adjustable to accommodate widths from ¾ inch to 2 inches. This width adjustment is preferably accomplished by providing transversely movable plates 28, 30 on the sides of each of the troughs 24, 26, respectively.

Each of the stations 12, 14 is also provided with a respective feed roller assembly 32, 34 for feeding continuous lengths of the first material, designated 36 and 38, from the rolls 16 and 18, respectively. At this point, it should be noted that the operation of the feed rollers 32, 34 as well as other actuated components of the system 10 are controlled by means of a programmable controller which is designated generally as 40 and that the feed rollers may be operated by any conventional drive mechanism such as pneumatic or electric motors.

As the first material 36, 38 is fed along the troughs 24, 26, it passes beneath cutter assemblies 42, 44 which each include a cutter anvil and a cutter blade (not shown) lying beneath the trough 24, 26 in alignment with the anvil. When a predetermined length of material has been fed past the cutter assemblies 42, 44, as may be measured by the angular rotation of rollers forming the feed assemblies 32, 34, the controller 40 will actuate the cutter blades to move upwardly into cooperation with the cutter anvils and thereby sever the lengths of first material 36, 38. The severed lengths of material at the first stations 12, 14 is preferably in the form of a short tab having a length from 2 to 4 inches.

As the material 36, 38 is fed past the cutters 42, 44, it passes beneath a pawl 46, 48 for conveying the tabs of first material from the first supply stations 12, 14 to the bonding station 20. The mechanism provided for actuation of the pawl 46, 48 will be described with particular reference to the pawl 46. The pawl 46 is mounted to a pivot arm 50 which extends parallel to the trough 24 and which is attached to a slide block 52 at a pivot sleeve 54 of the block 52. A pin (not shown) is rigidly attached to the arm 50 and extends through the sleeve 54 and is attached to the end of a pivot lever 56. An opposite end of the pivot lever 56 is attached to a piston rod 58 of a pneumatic cylinder 60 supported on the slide block 52. Thus, upon actuation of the cylinder 60 to move the piston rod 58, the arm 52 and lever 56 will be pivoted to move the pawl 46 toward and away from the trough 24 such that the pawl 46 may be selectively engaged with and disengaged from material within the trough 24.

A pneumatic slide actuator cylinder 62 is mounted in stationary relationship to the trough 24 and includes a piston rod 64 which is attached to the slide block 52. Actuation of the cylinder 62 results in forward and rearward movement of the slide block 52 along slide rails 66, 68 whereby the pawl member 46 is caused to move forwardly and rearwardly along the trough 24. A similar mechanism is provided for actuation of the pawl 48 within the opposing station 14.

Figure 2:
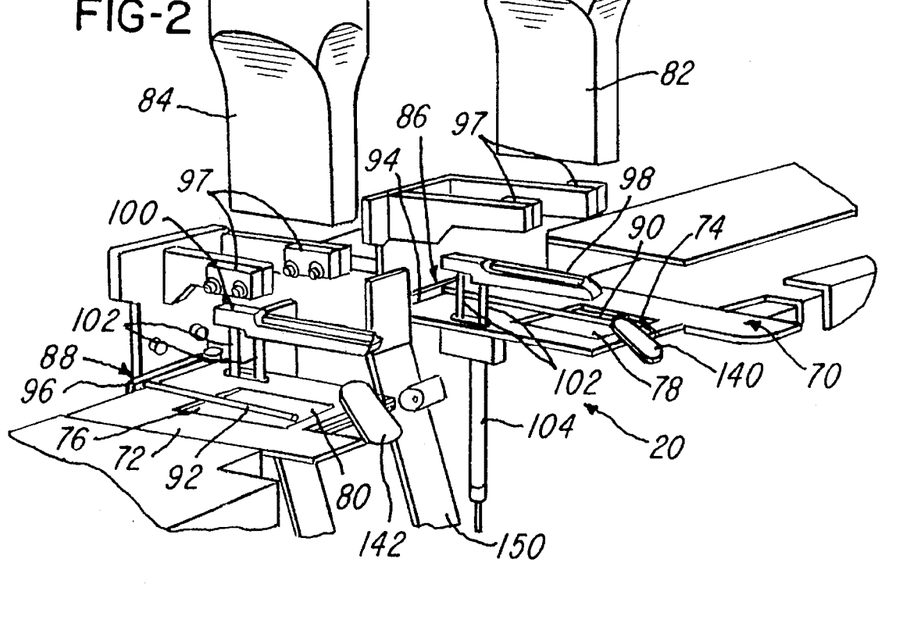
FIG. 2 is a perspective view showing details of the bonding station.

As may be seen in FIGS. 1 and 2, the bonding station 20 includes a pair of material receiving platforms 70, 72. The platforms 70, 72 are each provided with a tab positioning trough 74, 76 which are formed as indented areas on the platforms 70, 72. The tab positioning troughs 74, 76 each include a welding anvil area 78, 80 located in vertical alignment with the bottom surfaces of a pair of welding horns 82, 84. The welding horns 82, 84 are of conventional construction and may form part of a Branson Ultrasonic Welding System made by Branson Sonic Power Company of Danbury, Conn.

Each of the platforms 70, 72 is also provided with a flipper element 86, 88 having respective elongated rods 90, 92 mounted to pivot arms 94, 96. Each of the arms 94, 96 are mounted for pivotal movement by a conventional actuation mechanism (not shown) whereby the rods 90, 92 are pivoted upwardly in an arc toward the center of the bonding station 20.

A pair of clamps 98, 100 are mounted for vertical movement on the platforms 70, 72 by means of sliding rods 102 which pass through the platforms 70, 72. One of the rods 102 for each of the clamps 98, 100 is preferably a piston rod extension for a respective pneumatic cylinder actuator 104, 106. The actuators 104, 106 cause vertical movement of the clamps 98, 100 downwardly into contact with the platforms 70, 72 whereby material may be held in position between the clamps 98, 100 and the platforms 70, 72.

It should be noted that a set of sensors 97 is mounted above each of the platforms 70, 72 for sensing the presence of the materials in the bonding station 20 to produce a signal which is received by the controller 40.

Referring to FIG. 1, the band supply station 22 includes a material guide trough 108 for guiding the second material 110 as it is fed by a feed roller assembly 112. The width of the trough 108 may be adjusted by moving an adjustable plate 114 defining one side of the trough. The width of the second material 110 preferably corresponds to the width of the first material 36, 38 and therefore may vary from 2 inches to 4 inches. A severing assembly 116 is provided at the end of the trough 108 and the material 110 is fed between an anvil and a cutting element of the assembly 116 such that the material 110 may be cut to a desired length by the assembly 116.

A transfer assembly 118 is located adjacent to the cutting assembly 116 and includes a movable table 120 mounted for sliding movement on a stationary rail assembly 122. The table 120 is actuated for sliding movement relative to the rail assembly 122 by means of a pneumatic cylinder 124 mounted to the rail assembly 122 and having an actuated rod 126 attached to the table assembly 120.

Figure 7:
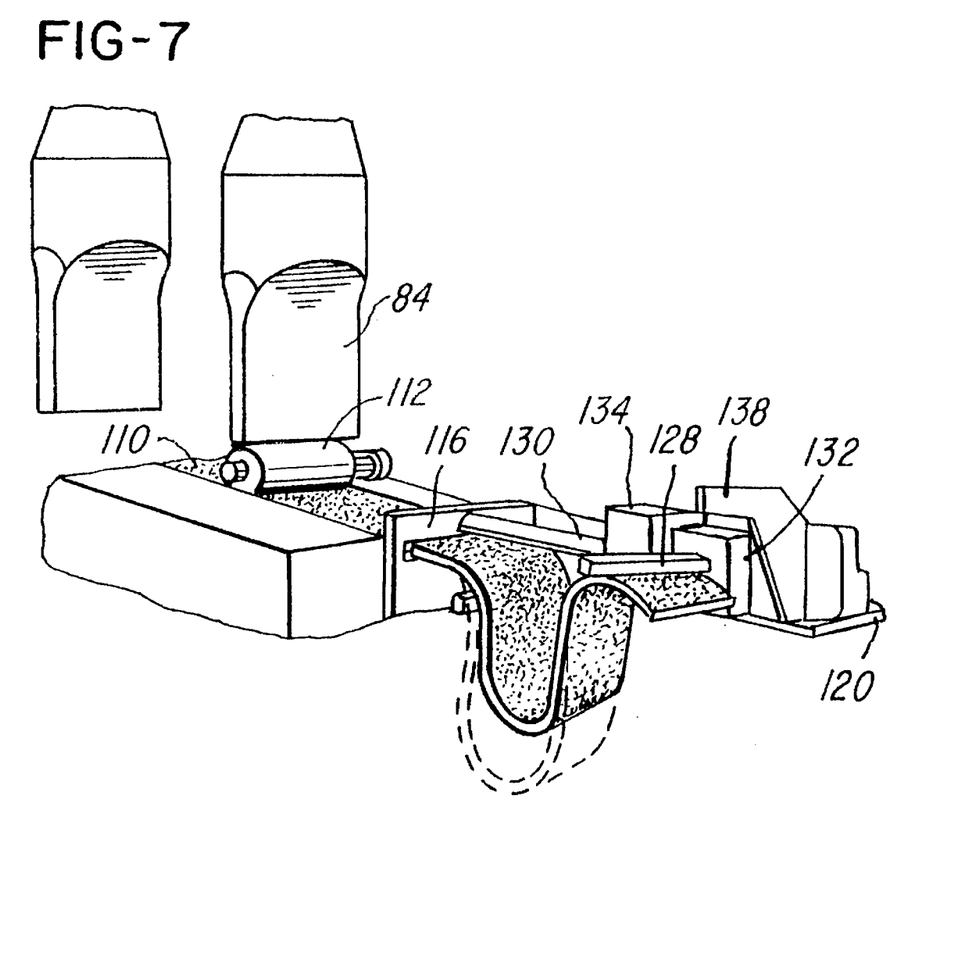
FIG. 7 is a perspective view showing the band supply station.

As seen in FIGS. 1 and 7, the transfer assembly further includes first and second grippers 128, 130 having movable gripping jaws for receiving the band of second material 110 as it is conveyed past the severing assembly 116. The grippers 128, 130 are mounted to and actuated by conventional pneumatic actuators 132, 134, respectively. In addition, a sensor 136 is mounted to a support arm 138 extending from the table assembly 120 adjacent to the first gripper 128.

In operation, the sensor 136 will sense the end of the second material 110 after it passes through the first gripper 128 and the sensor 136 will send a signal to the controller 40 resulting in actuation of the first gripper 128 to close on a first end the material 110. The second gripper 130 will continue to remain open as the feed assembly 112 feeds the material 110 downwardly in a loop between the first and second grippers 128, 130. The feed assembly 112 may be used as a measuring unit wherein a signal is sent to the controller 40 indicating the measured length of material conveyed by the feed assembly 112 subsequent to closing of the first gripper 128. Upon the feed assembly 112 sending a signal to the controller 40 corresponding to a predetermined length of material 110, the controller 40 will cause the second gripper 130 to close on a second end the material and will also cause the severing assembly 116 to be actuated to sever the material 110 thereby completing a predetermined band length of the second material 110.

Subsequently, the cylinder 124 will be actuated to move the table 120 forwardly to the bonding station 20. It should be noted that the bonding station 20 is further provided with a pair of guide plates 140, 142 which will act to guide the ends of the material 110 slightly upwardly to ensure that the ends will pass over the platforms 70, 72 into position over the tabs already located at the bonding station 20.

It should also be noted that during feeding of the material 110 into the grippers 128 and 130, various lengths of material for the band formed from the continuous length of material 110 may be selected without altering the relative physical position of the elements forming the system 10 since the ends of the band held by the grippers 128, 130 will always extend the same amount outwardly from the grippers 128, 130 and therefore will always be properly aligned with the tabs when transferred to the bonding station 20. In the preferred embodiment, the length of the band may be varied from 7 to 16 inches by altering the programming of the controller 40. FIG. 7 illustrates the position of the band of material 110 just prior to the second gripper 130 closing, and an alternative length of material is shown in phantom lines.

Further, it should be noted that a horizontal support plate (not shown) is preferably provided between the grippers 128, 130 for guiding the end of the material 110 as it is conveyed from the second gripper 130 to the first gripper 128. Once the end of the material 110 is located below the sensor 136 and the first gripper 130 has closed, the support plate (not shown) will move downwardly to permit the material 110 to loop downwardly below the grippers 128, 130.

Figure 3:
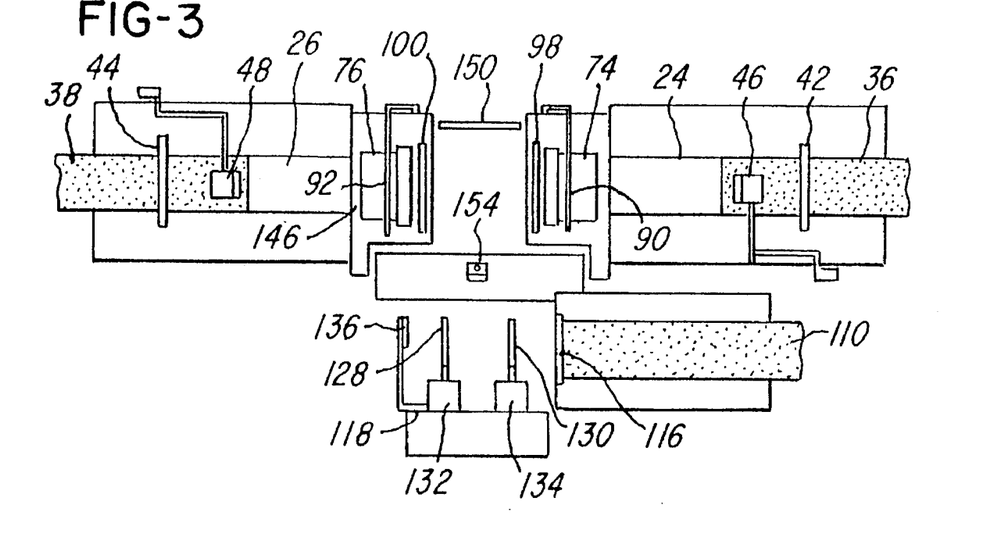
FIG. 3 is a diagrammatic view showing an initial step of the method of the present invention.

The operation of the welding system 10 will now be described with reference to FIGS. 3–6 which illustrate various steps of the operation. FIG. 3 illustrates an initial position of the machine in which continuous lengths of the first material 36, 38 have been fed past the cutting assemblies 42, 44 and underneath the pawl members 46, 48. During the feeding of the material 36, 38, the pawl members 46, 48 are preferably pivoted upwardly out of contact with the troughs 24, 26 to thereby allow free passage of the material 36, 38. With the pawls 46, 48 pivoted down into contact with the material 36, 38, the cutter of the cutter assemblies 42, 44 may be actuated to form tabs 144, 146 of the first material.

Figure 4:
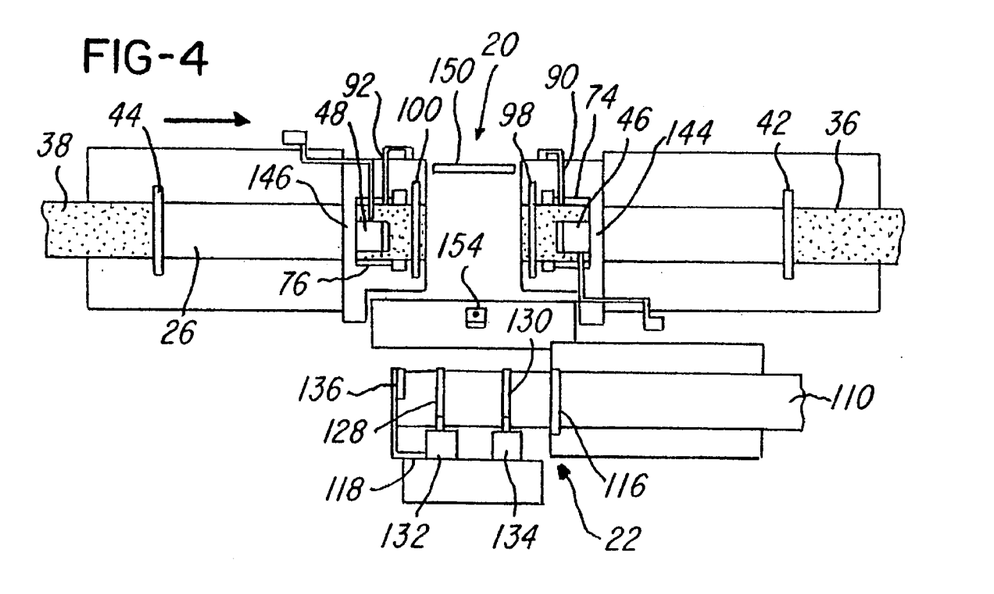
FIG. 4 is a diagrammatic view showing the step of placing the tabs in the bonding station and feeding a band of elongated material in preparation for transfer to the bonding station.

As seen in FIG. 4, the pawls 46, 48 are then actuated to move forwardly to place the tabs 144, 146 within the tab positioning troughs 74, 76. At this point, the clamps 98, 100 are still in their raised or upper position.

During the transfer of the tabs 144, 146 to the bonding station 20, or slightly prior to this time, the second material 110 is fed forwardly between the grippers 128, 130 within the band supply station 22. As seen in FIG. 4, an end of the second material 110 has arrived at a position directly beneath the sensor 136 and the first gripper 128 has been closed while the second gripper 130 remains in an open position and the material 110 continues to be fed past the severing assembly 116.

Figure 5:
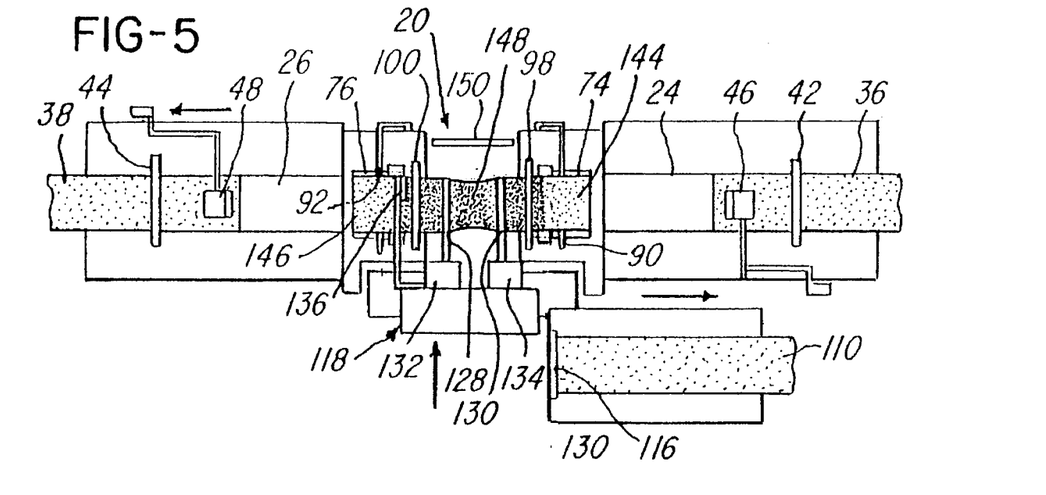
FIG. 5 is a diagrammatic view showing the step of placing the band of elongated material in the bonding station.

FIG. 5 illustrates the position of the transfer assembly 118 subsequent to the predetermined length of the second material 110 being fed between the grippers 128, 130 and being severed to form a band 148 having a predetermined length and having a center portion which is bowed downwardly between the grippers 128, 130. As may be seen in this figure, the transfer assembly 118 is moved into the bonding station 20 in a direction transverse to the movement of the tabs 144, 146 into the station 20, and the ends of the band 148 are passed into overlapping relationship with the ends of the tabs 144, 146 wherein the overlapping portion is located above the welding anvils 78, 80.

At this time, and prior to the pawls 46, 48 moving out of the bonding station, the cylinders 104, 106 are actuated to cause the clamps 98, 100 to move downwardly to simultaneously clamp the ends of the tabs 144, 146 and the band 148 in overlapping relationship. With the material thus clamped, the transfer assembly 118 will move back out of the bonding station and the pawls 46, 48 will be lifted out of contact with the tabs 144, 146 and then moved back toward the cutting assemblies 42, 44. The welding horns 82, 84 will be actuated to move downwardly into contact with the material at the anvils 78, 80 to thereby fuse the ends of the band 148 to the ends of the tabs 144, 146.

Figure 6:
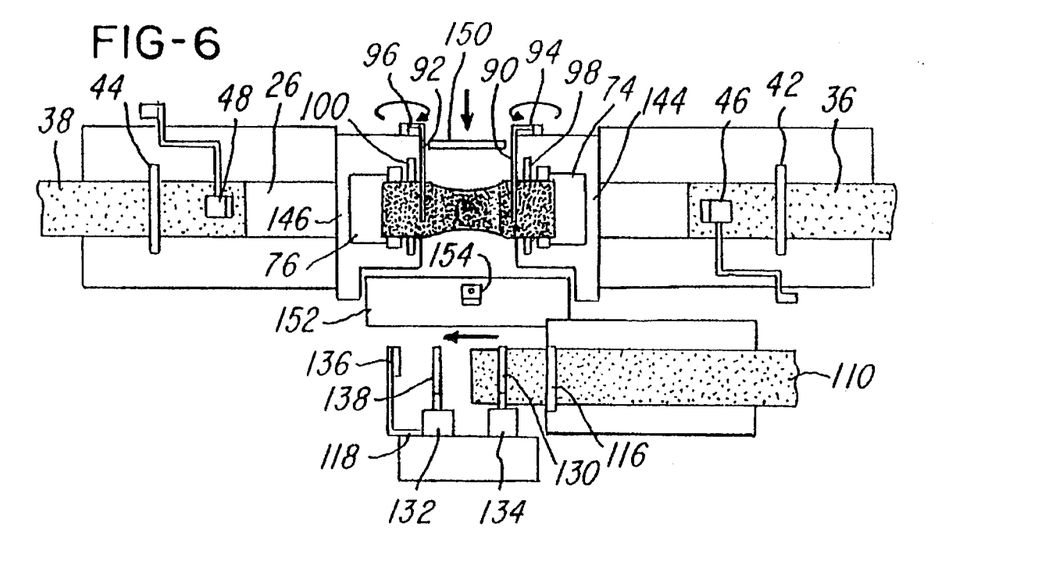
FIG. 6 is a diagrammatic view showing the step of flipping the ends of a completed band of material toward the center of the bonding station and ejecting the completed band into a bundling tray.

Referring to FIG. 6, after the welding horns 82, 84 have lifted away from the fused material, the flippers 86, 88 will be actuated to cause the free ends of the tabs 144, 146 to flip over the clamps 98, 100 and into contact with the band 148. At this point, it should be noted that when the tabs 144, 146 formed of the first material include a surface forming the hook portion of the hook or loop fastener, the second material 110 should be formed with a surface having a loop fastener portion of the hook or loop fastener material such that upon engagement of the tabs 144, 146 with the band of material 148, the tabs will remain in fastening engagement with the band 148. This ensures that the tab portion of completed bands will not become attached to the band portion of adjacent completed bands when several completed bands are grouped together.

Finally, the cylinders 104, 106 will be actuated to move the clamps 98, 100 upwardly to release the bonded band formed by the fusing operation and an ejector plate 150 will move forwardly to slide the band off the clamps 98, 100, as seen in FIG. 7. The band will thereafter fall into a bundling tray 152.

It should be noted that the bundling tray 152 includes a fastener ejector, diagrammatically depicted as 154. The fastener ejector is of conventional design and may be used to fasten a predetermined number of bands together into a bundle. The particular number of bands bundled together may be controlled by the programming of the controller 40 such that the number in the bundle may be easily altered by altering the programming. Further, the number of bands deposited in the tray 152 for forming a bundle may be easily monitored by counting the number of times the ejector 150 is actuated or by monitoring some other function during the formation of the completed bands.

Figure 8:
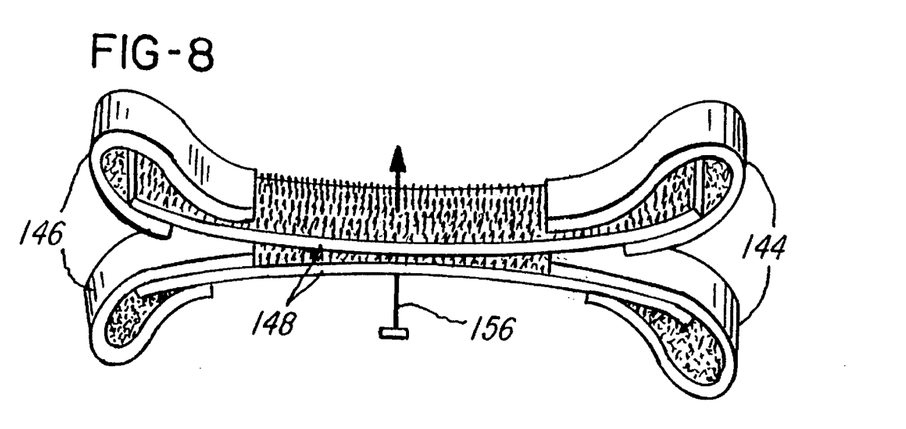
FIG. 8 is a perspective view showing two completed bands fastened together.

A bundle of completed or fused bands is illustrated in FIG. 8, in which the bands are held together by a conventional elongated plastic fastener 156 passing through a central portion of the bands.

After completing the ejection operation illustrated in FIG. 6, the fusing system 10 will automatically perform another band fusing operation as shown by the positioning of the material 36, 38 underneath the pawls 46, 48 and the conveying of the material 110 between the grippers 128, 130. During the continuous operation of the system 10, a bundle of two completed bands may be produced every nine seconds such that a complete cycle time for forming one complete fused band will be approximately 4.5 seconds.

Thus, the present fusing system 10 provides a convenient means for simultaneously attaching tabs to opposing ends of a band of material. Further, the system 10 permits the length of the band of material to be conveniently altered by altering the programming of a controller without altering the physical characteristics of the machine. Finally, the present apparatus provides a convenient means for packaging or bundling a predetermined number of bands together for a future operation wherein the number of bands provided in the bundle may be conveniently altered by altering the programming of the controller.

While the form of method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. An apparatus for bonding strips of a first material to strips of a second material, said apparatus comprising:

first supply means including means for supplying first and second strips of said first material;

second supply means including means for supplying a continuous length of said second material, measuring means for measuring the length of said second material and severing means for cutting said second material to a predetermined length such that first and second ends are defined on said second material;

a bonding station for receiving said first and second materials, said first supply means providing said first and second strips of said first material to said first and second ends, respectively, of said second material, and said bonding station including means for bonding said first and second materials together; and wherein said severing means is actuated subsequent to said measuring means measuring said predetermined length of said second material, and said second supply means includes means for varying the measured length of said second material at which said severing means is actuated to thereby alter said predetermined length of said second material.

2. The apparatus of claim 1, wherein said second supply means moves said second material toward said bonding station in a first direction and said first supply means moves said first and second strips of said first material toward said bonding station in opposing second and third directions transverse to said first direction.

3. The apparatus of claim 1, wherein said bonding station includes first and second ultrasonic welding horns for bonding first and second strips of said first material to opposing ends of said predetermined length of said second material.

4. The apparatus of claim 1, wherein said first supply means includes cutting means for cutting said first material to a predetermined length and pawl means for transferring said first material to said bonding station.

5. The apparatus of claim 4, including clamping means in said bonding station for clamping said first and second materials in an overlapping relationship to each other prior to a bonding operation.

6. The apparatus of claim 1, wherein said second supply means includes first and second grippers and feed means for feeding said continuous length of said second material to said grippers, said first gripper closing on a first end of said second material, said feed means subsequently continuing to feed said second material until said predetermined length has been fed and said second gripper then closing on a second end of said second material.

7. The apparatus of claim 6, including means mounting said first and second grippers for movement toward and away from said bonding station whereby said second material is moved into contact with said first material in said bonding station.

8. The apparatus of claim 1, wherein said first material includes a surface formed of hook or loop fastener elements and said band includes a complementary surface formed of hook or loop fastener material, said bonding station including material flipper means for flipping an end of said first material into overlapping relationship with said second material subsequent to an operation bonding said first material to said second material such that said hook and loop elements engage with each other to hold said first material in a folded position over said second material.

9. The apparatus of claim 1, including bundling means for receiving strips of said first and second material which have been bonded together and joining a predetermined number of said bonded strips together with fastening means.

10. An apparatus for bonding a tab formed of a first material having a hook or loop-type surface to a strip of a second material, said apparatus comprising:

first supply means including means for supplying continuous lengths of said first material and means for cutting said first material to a predetermined length, second supply means including feeding means for supplying and feeding said second material, measuring means for measuring the length of said second material and transfer means having first and second gripper means, said feeding means feeding said second material to a location between said first and second gripper means, a bonding station for receiving said first and second materials and including an ultrasonic welding device for bonding said first and second materials together, said transfer means being mounted for movement toward and away from said bonding station to transfer said second material to said bonding station, control means for receiving a signal from said measuring means corresponding to said feeding means feeding a length of said second material, said control means being connected to said first and second gripper means for actuating said gripper means in response to a sensed length of said second material, and wherein said control means actuates said first gripper means to clamp an end of said second material and acts to delay actuation of said second gripper means subsequent to actuation of said first gripper means until said feeding means feeds a predetermined sensed length of said second material between said first and second gripper means.

11. The apparatus of claim 10, wherein said first supply means provides first and second tabs to said bonding station for bonding to opposing ends of said second material.

12. The apparatus of claim 10, including sensing means adjacent to said first gripper means for sensing the presence of said second material, said control means actuating said first gripper means in response to a signal from said first sensing means.

13. An apparatus for bonding strips of a first material to strips of a second material, said apparatus comprising:

first supply means for supplying said first material;

second supply means for supplying a strip of said second material, a bonding station for receiving said first and second materials, said bonding station including bonding means; and wherein said first material is conveyed to said bonding station in a first horizontal direction, said strip of said second material is conveyed to said bonding station in a second horizontal direction transverse to said first horizontal direction, and said bonding means bonds said first and second materials together.

14. The apparatus of claim 13 wherein said second supply means includes first and second grippers for holding opposing first and second ends of said strip of said second material for conveying to said bonding station.

15. The apparatus of claim 14 wherein said first and second grippers are positioned apart from each other a predetermined distance to define a space therebetween, said first and second grippers being mounted for movement in said second horizontal direction to position said second material in said bonding station.

16. The apparatus of claim 15 including means for feeding said strip of said second material into said space between said first and second grippers.

17. The apparatus of claim 16 wherein said first and second grippers are adapted to position strips of said second material having different lengths with said first and second ends being located at predetermined locations within said bonding station.

* * * * *